United States Patent
Luedtke

[19]

[11] Patent Number: 6,092,136
[45] Date of Patent: Jul. 18, 2000

[54] MULTI-PROCESSOR CENTRAL PROCESSING UNIT

[75] Inventor: Harald Luedtke, Paderborn, Germany

[73] Assignee: Siemens Nixdorf Informationssysteme AG, Paderborn, Germany

[21] Appl. No.: 09/125,572
[22] PCT Filed: Feb. 4, 1997
[86] PCT No.: PCT/DE97/00216
§ 371 Date: Aug. 20, 1998
§ 102(e) Date: Aug. 20, 1998
[87] PCT Pub. No.: WO97/31318
PCT Pub. Date: Aug. 28, 1997

[30] Foreign Application Priority Data

Feb. 22, 1996 [DE] Germany .............. 196 06 629

[51] Int. Cl.$^7$ ..................................................... G06F 13/00
[52] U.S. Cl. ........................................... 710/107; 710/129
[58] Field of Search ................................. 710/107–129

[56] References Cited

U.S. PATENT DOCUMENTS 4,718,006  1/1988  Nishida .
5,197,130  3/1993  Chen et al. .

FOREIGN PATENT DOCUMENTS 0 333 537 A1  9/1989  European Pat. Off. .
0 345 738 A2  12/1989  European Pat. Off. .
0 380 851 A2  8/1990  European Pat. Off. .
WO 94/01815  1/1994  WIPO .

OTHER PUBLICATIONS

IEEE Standard for Scalable Coherent Interface (SCI) (1596–1992), pp. 1–47.
Wissen (SCI), Markus Leberecht, Low–Cost–Parallelrechner, pp. 162–166.
IEEE Transactions on Computers, vol. 42, No. 4, Apr. (1993), Ashwini K. Nanda et al, Design and Analysis of Cache Coherent Multistage Interconnection Networks, pp. 458–470.

Primary Examiner—Ayaz R. Sheikh
Assistant Examiner—David A. Wiley
Attorney, Agent, or Firm—Hill & Simpson

[57] ABSTRACT

Central processing units have two or more groups of in each case one processor, one memory and one coupler, the processor and memory are connected to exactly one coupler and the couplers are connected to one another. A memory area distributed uniformly over the address space is allocated disjointedly to each group by address interleaving and each coupler itself meets an access to the memory area allocated to its group and meets other accesses via the connection to the coupler concerned. The central processing units are provided with interfaces for building up multiple systems.

34 Claims, 3 Drawing Sheets

MULTI-PROCESSOR CENTRAL PROCESSING UNIT

BACKGROUND OF THE INVENTION

The method relates to modular multi-processor systems.

High-performance computer systems are frequently constructed as multi-processor systems. A large number of processors is of particular use for transaction systems such as booking systems and reservation systems in order to achieve a uniform response-time characteristic. In this arrangement, modules which are connected to one another via a common backplane are suitably used. Each module, called central processing unit in the text which follows, contains one or more processors which are coupled via a bus system on the backplane.

The memory accessible to the processors can be connected to the backplane as a separate memory module, on the one hand. However, this leads to the band width of the bus system restricting the efficiency of the overall system.

It has been proposed, therefore, to distribute the memory over the central processing units and, therefore, also to arrange in each central processing unit memory which can be reached both by the processor directly and by the other processors via the bus system. The respective memories are mapped into the address space shared by all processors by means of address conversion. Programs or data located in the local memory can be accessed especially rapidly and efficiently. For this reason, this memory is also placed into the address space as a single continuous block.

Nevertheless, the bus system remains to be a bottleneck in the case of very high-performance computers comprising a number of processors. Each access outside the local memory is handled via the bus system. It is a rare achievement for the major proportion of memory accesses to be accesses of the local memory except in statically configurable process control or transaction systems. Even if half the accesses were accesses of the local memory, for example in a four-processor computer, the band width of the bus system would have to be twice as high as that of one processor. Without increasing the band width of the bus system, changing to eight or sixteen processors is therefore associated with an increase in performance which is greatly less in proportion.

There is also a problem inasmuch as fast bus systems cannot have an arbitrary length. At the currently used frequencies and technologies, the bus length is restricted to about 30 cm due to signal delay times and impedances. Given a width of 3 cm of a central processing unit, which cannot be significantly reduced, this makes it possible to have a maximum of 10 modules, and thus 10 processors. High-performance transaction processing systems, however, require an even larger number of processors. The restriction in the number of modules can be counteracted by each central processing unit module containing a shared memory and a number of processors. However, since each central processing unit is connected to the memory in the other central processing units via the bus of the backplane, the loading of the bus system increases again to such an extent that the bus represents the component which limits the performance.

An alternative to a multi-computer system coupled by a bus system is a multi-computer system, the processors of which are connected in accordance with the IEEE "Standard for Scalable Coherent Interface" (SCI), IEEE STD 1596-1992 (ISBN 1-55937-222-2). This relates to point-to-point connections from one processor to the next. So that each processor can access the memory of each other processor, SCI defines a transfer protocol in which each processor forwards packets which are not intended for it to its neighbor so that a ring structure as described in Section 1.3.4 of the SCI document is needed in which each processor can buffer at least one data packet. This creates delays which, although they allow an arbitrary number of processors to be used, impair their performance. Here, too, a band width limitation is given even if this is higher compared with bus systems. It is therefore proposed, inter alia in Section 1.3.5, to build up a two-dimensional lattice structure in which each processor can only reach the other processors in the same line or column. Other connections must be handled via intermediaries called "agents" in Section 1.4.6. However the SCI protocol necessitates quite a high expenditure.

It is therefore the object of the invention to specify a central processing unit for a multicomputer system which avoids the abovementioned disadvantages.

SUMMARY OF THE INVENTION

The invention combines direct connections with bus systems and thus allows the number of bus systems to be multiplied and thus to achieve the same effect as a single bus system of correspondingly multiplied band width.

The preferred solution consists in using modules having two processors each and two separate memories. Each processor accesses the main memory via a coupler to which one of the two memories is connected directly. Each coupler is directly connected to the other coupler in the module and also has a port to a bus system so that memory accesses which are met neither by the directly connected memory nor by that at the directly connected coupler take place via the bus system. This solution thus allows the band width of the connection between the modules to be doubled in a simple manner by using two bus systems.

In a further development of the invention, each coupler has a direct connection to another coupler, which direct connection is connected to additional ports on the module. Thus, two modules can be connected in each case to one central processing unit slice in which four couplers are connected in the form of a ring. In this case, a type of direct connection is selected between the couplers which also allows an indirect connection to the diagonally opposite coupler.

The result is that a memory access needing a bus system only uses the bus system to which the coupler is connected to which the needed memory is directly connected. The other data paths are conducted via connections located in the respective central processing unit. At the same time, the use of bus systems provides for flexible extendibility and the connection of peripherals in a familiar manner.

In this arrangement, an especially advantageous solution is possible by means of address interleaving. For this purpose, low-significance bits of the address determine the coupler making the memory access. In the case of two processors per central processing unit and a block size of 32 bytes of the cache, the sixth (or seventh or eighth etc.) bit is used for selecting the coupler. This development is based on a number of couplers which is a power of two. The address resolution on the bus system is achieved in a familiar manner by placing the address on the bus and by the coupler having the associated memory completing the bus cycle. Thus, it is not necessary to address the central processing unit containing the relevant memory. As a result, no changes in the addressing are necessary by the bus system when a further central processing unit is added as is usual in the case of a bus system, since the distribution to the couplers remains the same.

Initially, this solution appears to be not very advantageous because even a small program, which is being executed in a processor, does not use only the memory directly connected to the coupler of the processor but also the memory connected to the other coupler or couplers. However, since there are caches and the connections between the couplers can be built up particularly rapidly as point-to-point connections, this disadvantage is canceled by the ease of extendibility.

Thus, there are central processing units comprising two or more groups of in each case one processor, one memory and one coupler, wherein processor and memory are connected to exactly one coupler and the couplers are connected to one other, a memory area distributed uniformly over the address space is allocated disjointedly to each group by means of address interleaving and each coupler itself meets an access to the memory area allocated to its group and meets other accesses via the connection to the coupler concerned. The central processing units are provided with interfaces for building up multiple systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
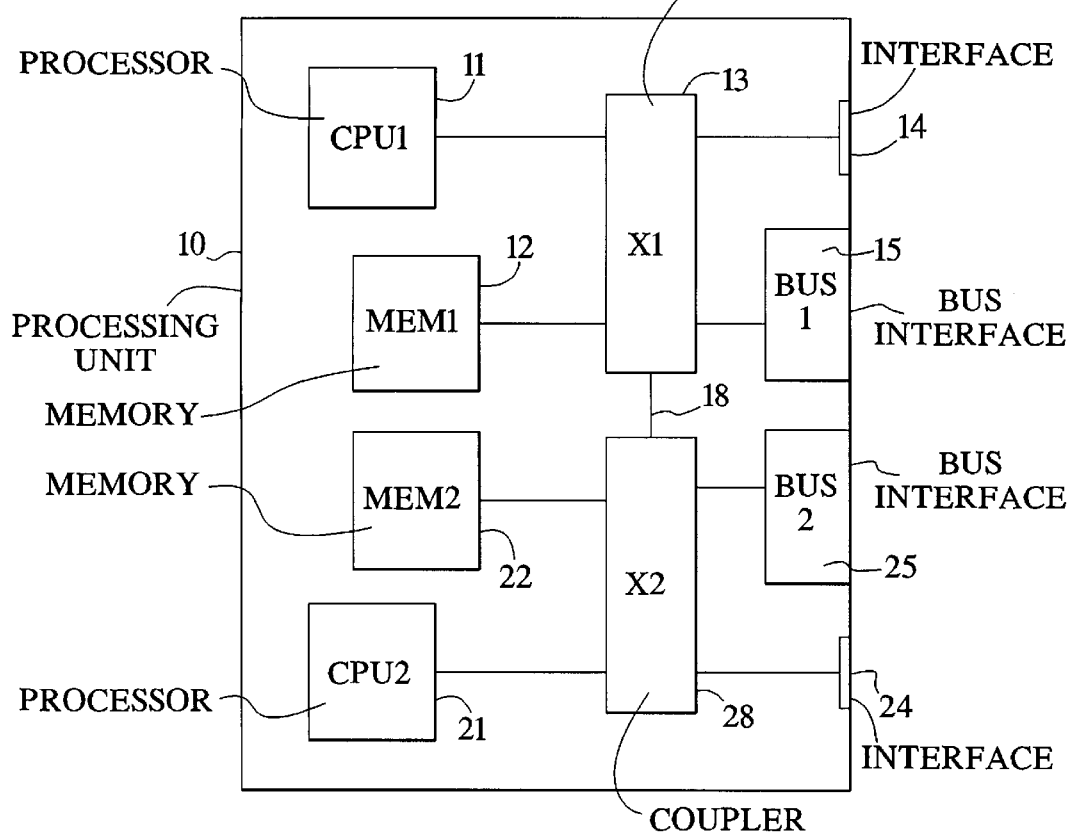
FIG. 1 shows a central processing unit according to a preferred embodiment of the invention comprising two processors, two memories and two couplers, two direct connections and two bus ports.

FIG. 1 diagrammatically shows a central processing unit 10 which has two processors 11, 21, two memories 12, 22 and two couplers 13, 23. The upper group consists of a processor 11, a memory 12 and a coupler 13; the lower group consists of another processor 21, memory 22 and coupler 23. Both processors use the same address space and can use the memory of the other processor in each case. For this purpose, a processor conveys the access request to the coupler connected to it. The latter uses either the directly connected memory or forwards the access request via the connection 18 to the other coupler so that it can be met by the memory connected there.

Various methods can be used for connecting the couplers to one another by means of point-to-point connections. One possibility is the abovementioned SCI connection according to IEEE STD 1596-1992. As a rule however, a simpler connection via unidirectional or bidirectional data and address lines and strobe and acknowledgment signals generally known is sufficient. In the case where indirect availability is necessary, one or two additional address lines are used which specify the coupler for which the signals are intended. In this arrangement, the signals are not stored but forwarded directly to the connection to the next coupler if possible. The design of such a circuit is generally accessible to the expert and will be assumed to be known in the text which follows.

In this case it must be specified which area of the address space belongs to the first coupler 13 and the memory 12 connected to it and which belongs to coupler 23 and memory 22. Usually, contiguous memory areas from the entire address space of the processors are in each case allocated to memory 12 and memory 22 and determined by address comparators. In this case, the dual-processor central processing units could be combined to form multi-processor systems by providing the central processing unit with an interface (not shown in FIG. 1) for a shared bus system and adding a memory management which determines whether the local memory is affected or it is intended to access the bus and thus memory areas of the other central processing units. If the memory area addressed is neither in the directly connected memory nor in the memory connected to the other coupling units, the memory access is handled via the bus. Simple table accesses can be used for the decision about which connection a coupler uses for the access, especially if the two memory areas of a central processing unit fit together closely and the memories in each central processing unit are of the same size.

In the preferred embodiment of the invention, however, a different partition of the memory is used. In this arrangement, the address areas are interleaved and the physical memory is distributed in small units over the address space. This type of addressing is known as interleaving if one or more processors access memory modules which can be accessed with equal access authorization, i.e. with equal efficiency by all processors and which need a recovery time after an access. This is described for example, in the book "Digital Systems: Hardware Organization and Design", F. J. Hill and G. R. Peterson, New York 1973, from Section 14.3, under the keyword "Interleaving". For example, by placing the even-numbered addresses in one memory bank and the odd-numbered addresses in a second memory bank, the second memory can already be accessed during the recovery time of the first memory in the case of two successive memory accesses. Thus, interleaving has hitherto been used for compensating for the recovery time of two or more memory banks.

The technique used in the invention, which is similar to interleaving, will be called address interleaving in the text which follows. In this arrangement, the address space is divided into many blocks of equal size, hereinafter called lines. Each line must be at least as large as the data volume transmitted between processor or, respectively, memory and coupler. This information unit is called "cache line" especially when caches are used. In most cases one line is a multiple of the word width of the processor used. When caches are used, which is probably always the case in practice, the word width of the instructions of the processor is, however, without significance; and this is why the volume of data transmitted undivided between processor or, respectively, memory and coupler will be called memory word hereinafter for the sake of clarity. Address interleaving is then done on the basis of a memory word or of a multiple thereof. In each case, one bit of the binary address is sufficient for determining the memory bank in the case of dual interleaving. Usually, a number of memory banks is used which is a power of two so that the memory bank can be determined by extracting one bit field. Measurements can be used for determining whether interleaving by means of the last address bits or in larger units is more advantageous. Interleaving, for example, to 16 times one memory word can be achieved without problems by rewiring the address lines so that, for the sake of simplicity, address interleaving on the lowest bit or bits will be assumed in the text which follows without the invention being limited to this. In contrast, interleaving will always use the greatest possible distribution, that is to say always the least-significant address bits.

In the present invention, however, address interleaving is not used for bridging recovery times of the memory. Instead, it is used in combination with the fact that each memory unit is also associated with a processor, for providing a central processing unit which can be combined to form multi-processor systems in a simple manner and with little loss of performance. In this arrangement, it appears to be disadvantageous at first to interleave the two memories located in the central processing unit instead of allowing them to adjoin one another. In the case of memories adjoining one another, a process which is essentially confined to the area of the memory local to the processor can be run especially efficiently. In the case of an interleaved memory, however, virtually every process must also use the non-local memory over the detour via the connection of the two couplers. Since, however, as has been shown by more detailed investigations with the operating systems of current relevance, scarcely any process can be confined to a certain memory area in practice, said advantage of memory areas adjoining one another closely cannot be achieved effectively. Thus, interleaving the memories does not mean a disadvantage in practice. In fact, it has been found to be an advantage if the operating software uses shared memory areas, especially for the operating system. In the previous arrangement, the processor which did not have these areas in the local memory was at a disadvantage. Thus, the execution time of a process was slower on one processor than on the other one. This is avoided by the invention without any deleterious effect on the overall performance of the system.

The dual-processor central processing unit hitherto described is combined to form multi-computer systems in various manners which are at the same time simple and efficient. Both the direct interfaces 14, 24 to the point-to-point connection of couplers and the bus interfaces 15 and 25 are suitable for this purpose.

Figure 2:
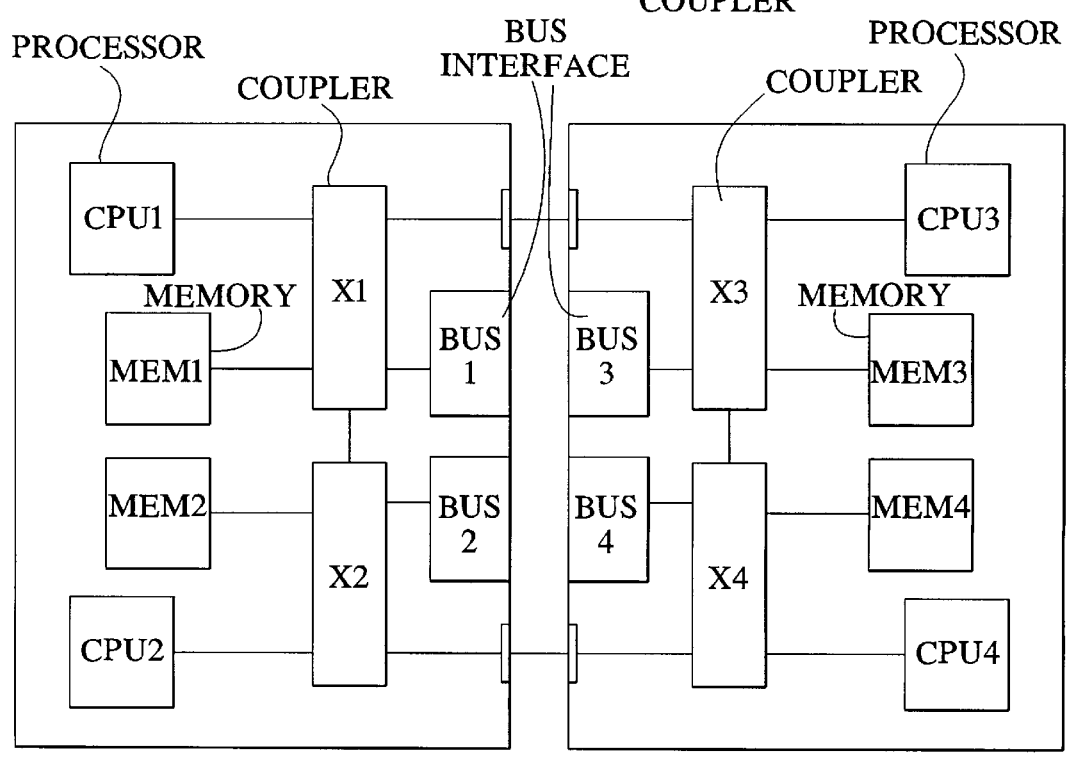
FIG. 2 shows a combination of two central processing units to form a virtual four-processor central processing unit which, with four bus systems, can serve as part of a larger multi-processor system.
Figure 4:
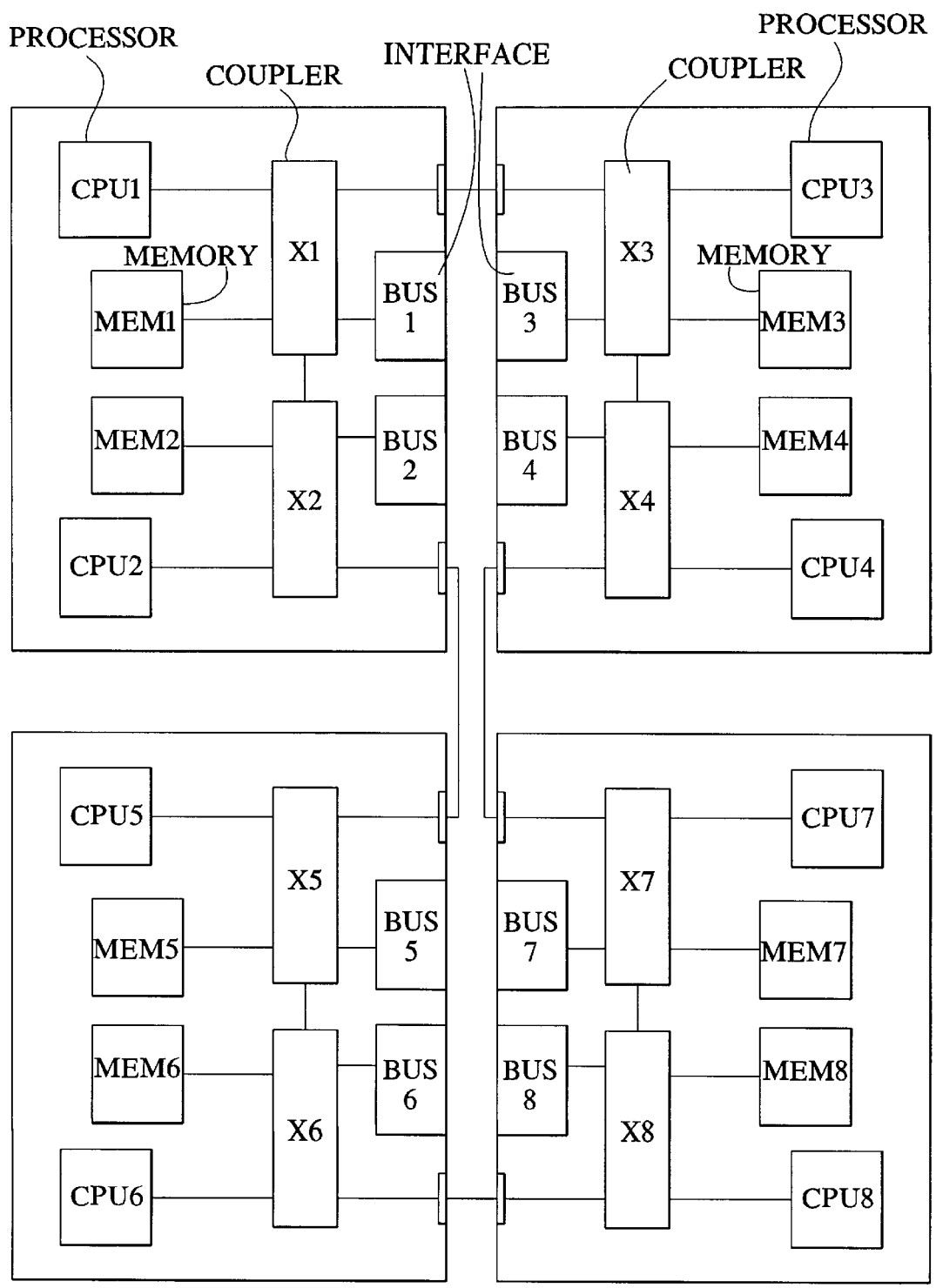
FIG. 4 shows a combination of four dual-processor central processing units to form an octuple processor slice which can be connected to other octuple processor slices by means of the eight bus systems.

As can be seen from FIG. 1, one direct connection interface 14 and, respectively, 24 is provided for each coupler. This makes it possible to combine two central processing units to form one central processing unit having four processors and quadruple interleaving as is shown in FIG. 2. A second similar central processing unit has the couplers X3 and X4, the processors CPU3 and CPU4 and the memory MEM3 and MEM4. The couplers X1, X2, X3 and X4 are connected to one another in the form of a ring. The memory is now quadruple interleaved. This can be done in a simple manner by adding a further address bit during the installation, for example by means of a jumper in the central processing unit so that a single type of central processing unit can be used both as dual processors and as quadruple processors. From the two address bits, each coupler can determine whether the access is to take place to the memory connected directly, the memory of an adjacent coupler or the memory of an opposite coupler. This does not require any comparators; since it is necessary to convert only two bits from the address with respect to the two bits specifying the number of the coupler, into four bits for driving the corresponding data paths, this can be achieved easily by medium-density integration such as gates, multiplexers and decoders. In particular, one bit of the address is used, if necessary by means of an inverted exclusive OR, for deciding whether it is necessary to address the coupler in the same central processing unit or that in the other one via the interface 14, 24 if the memory cannot be used directly. As shown in FIG. 4, the principle can also be used for forming an octuple slice by coupling the four dual-processor central processing units in the form of a ring to the in each case two direct interfaces. The relative loss of performance due to the ring structure is compensated for by the fact that direct connections allow a higher speed than bus systems so that the octuple slice displays relatively better performance than eight central processing units connected by a bus system.

The point-to-point connections needed for this are known to the expert. The connecting lines needed for this convey the relevant part of the address concerned and the data. It is no problem to use open-collector lines terminated at both ends. Since there are no mid-point junctions as in the case of bus systems and no arbitration is necessary, either, such point-to-point connections achieve high operating speeds and, at the same time, have a simple structure. If more than three couplers are connected in the form of a ring, there must be a possibility for a coupler to reach another one indirectly via an adjacent coupler. For this purpose, group address and acknowledgment lines are provided which are also constructed as point-to-point connections. If a coupler receives a request in which the group address line does not represent its group number, both the group addresses and all other lines are placed on the other point-to-point connection. Acknowledgment signals are also transmitted in a familiar manner since the coupler addressed may not be able to handle the requests arriving via the point-to-point connections immediately because its own processor has made a memory request which has not yet been dealt with.

Figure 3:
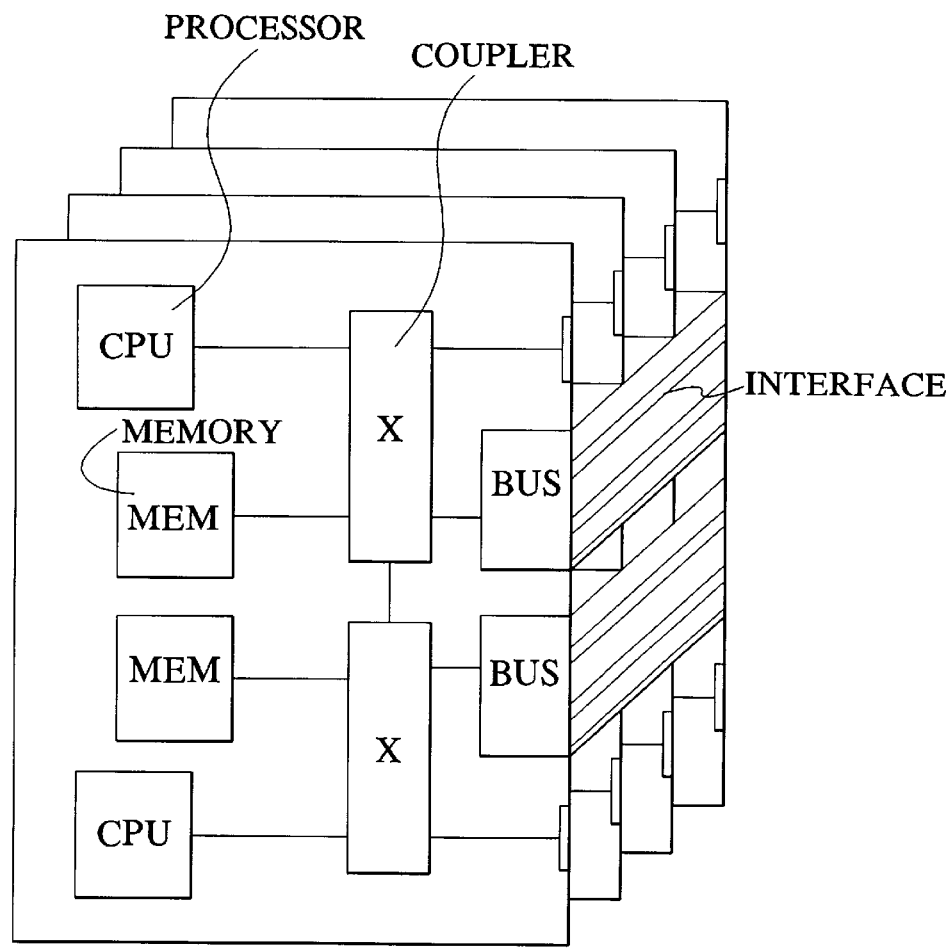
FIGS. 3 and 5 shows a combination of four dual-processor central processing units to form an octuple multi-processor system connected by means of two bus systems.

Using bus interfaces 15, 25, multi-processor systems are combined in which a variable number of central processing units is combined. Such an arrangement with four dual-processor central processing units is shown in FIG. 3. For this arrangement, double interleaving based on the processor or cache word widths or a multiple thereof is preferably used in order to determine whether a memory access of the processor is handled via the connection of the two couplers or the coupler is performing the access locally or, respectively, via the bus 15, 25 connected to it. As indicated in FIG. 3, two bus systems are used which in each case connect the central processing units with one another. The couplers connected in this manner by the bus in each case effect the access to the same memory class with respect to the interleaving. Thus, the coupler, after it has been established on the basis of the interleaving that the access is not taking place via a coupler connected directly (or indirectly in a ring), uses memory managers as further means for deciding whether the address leads to the local memory or is to be requested via the bus system. Comparators for memory addresses or even further adjustable address interleaving can be used for this purpose. These address managers, needed for this purpose, are known from the production of multi-processor computers with bus systems.

In every case, there are multiple bus systems for handling the memory requests of the central processing units between themselves. This eliminates a significant bottleneck of the previous multi-computer systems without requiring significant additional expenditure for driving the bus systems. If, as represented above and in FIGS. 2 and 4, respectively, two or four central processing units of the preferred form are combined to form a quadruple or octuple slice, there will be four or, respectively, eight bus systems for handling the data traffic between the central processing units of the multiprocessor system. If thus, for example, the bus systems allow up to ten plug-in locations for central processing units, computer systems of two times eighty processors can be built up by using one and the same dual-processor central processing unit module, the computing power increasing almost linearly with the number of processors without a single bus system representing a bottleneck.

As can be seen from FIGS. 2 and 4, the dual-processor central processing unit of the preferred embodiment also allows, as already implicitly assumed above, the possibility of arranging the central processing units in such a manner that the individual bus systems have minimum length and do not cross over. Although this requires different receptacles for the central processing unit modules for the maximum configuration levels of 20, 40 and 80 processors, the central processing units remain the same.

By connecting the direct connections of adjacent central processing units in pairs in each case in the arrangement according to FIG. 3, a linear arrangement also makes it possible to achieve a combination of up to eight quadruple slices by only designing the connecting backplane accordingly. In this arrangement, it is possible, on the one hand, to operate with two bus systems as shown in FIG. 3, two couplers of a quadruple slice in each case using the same bus. In this type of connection, the number of processors is restricted to only 4, 8, 12 or 16. At the same time, the backplane can be equipped with the plugs and connections of this type right from the start; the firmware configuration of the central processing units decides whether the direct connections to the other modules are used. Thus, the customer can initially expand his system by means of single central processing units, that is to say in steps of two with reference to processors. If there is an even number of processors, these can be reconfigured into quadruple slices of two processors each.

Figure 5:
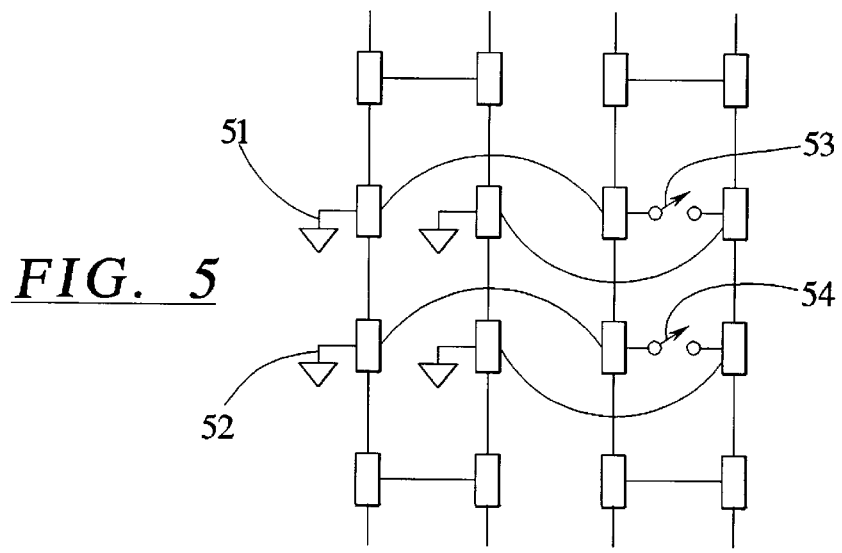

An improvement of the backplane in which, as shown diagrammatically in FIG. 5, each bus port of a central processing unit is connected to the next central processing unit but one, provides four bus systems. The full performance is thus reached with quadruple slices. The bus systems are terminated at one end by terminations 51, 52. Clampers 53, 53 connect the four bus segments to two bus systems in the closed state. In the open state, the bus systems are connected to further terminations, (not shown), thus creating four bus systems. Thus, the number of bus systems can be increased in a simple manner at the customer's premises, thus increasing the performance of the system almost proportionally to the number of central processing units installed.

This backplane also provides for a simple variant of the central processing unit which is achieved by distributing the dual-processor central processing unit hitherto described to two modules. Each of these single-processor central processing units has one processor, one memory, one coupler and both a bus port and a direct port. The connecting backplane used is an arrangement in accordance with the upper part of FIG. 5 but with fixed terminations instead of the jumpers so that physically there is a single row which, however, serves two separate bus systems. The direct interfaces are connected to one another in pairs. Since now two processors each are connected by the direct interfaces and there are two bus systems, a transport capacity is achieved which is more than twice as large as that of a known bus system. The same single-processor central processing units can be used for a conventional backplane having a single bus system by configuring the couplers in such a manner that they do not use the direct interface and, together with the special backplane, form a computer which can be expanded by means of two single-processor central processing units in each case and, nevertheless, achieves a high band width which is restricted much less than hitherto by the maximum band width of the bus system.

In high-performance computers, caches must usually be provided in order to achieve a good processing performance of the central processing unit. Since these caches also absorb a significant proportion of local data accesses, the address interleaving can be considered to be more of an advantage. This especially increases the granularity to one cache line. Caches belong to the respective processor and are conceptually located (not drawn) in the connection between the processor itself and the coupler. The cache controls are frequently also contained in the processor chip so that the processor has a direct connection to the cache and the cache of the connection to the coupler is also served by the processor.

To achieve a virtual simultaneous availability of all memory contents, i.e. a uniform memory, for all processors with a shared address space, there are two methods which are preferred for cache systems. Relevant notes are found, for example, in the article "A Class of Compatible Cache Consistency Protocols and their Support by the IEEE Futurebus" by P. Sweazey and A. J. Smith, Proc. 13th Int. Symp. on Computer Architecture, IEEE 1986.

One of these methods is called "snooping". It consists in that at least the addresses of all operations on a bus system which change the status of the cache are simultaneously forwarded to all cache units so that these can note the new status. This method is also possible in the case of the central processing unit according to the invention because each coupler can use the address for determining whether the address is sent to another coupler via a direct connection or is placed on the bus system. In this case, a variant of the invention is also possible in which, although the two bus systems 15 and 25 have separate address lines, they use shared data lines. Since a large proportion of the bus cycles are pure address cycles for cache line-up, both buses can share the data lines. Since the address buses also mainly have a width of 32 bits but data buses have a width of at least 64 but in most cases 128 or 256 bits, this can save a considerable number of ports without significantly impairing the performance. Or conversely, the dual central processing unit with address interleaving according to the invention achieves a doubling of the speed of cache line-ups with only 32 further ports to the backplane.

A preferred method for cache line-up with the invention, however, is one which is called "tagged" or "directory-based". In this method, the respective memory itself contains an additional indicator which is set with a reference to the requesting cache if a processor has requested and received a memory word in order to change it. If a second processor is accessing the same memory word (cache line), this access is redirected to the cache of the first processor or postponed until the cache entry of the first cache has been invalidated and transported back into the main memory. The deferment can be performed by aborting and repeating the access attempt. In the "directory-based" cache consistency method too, a considerable data transfer must be handled. The invention allows this transfer to be distributed uniformly over a number of bus systems in a simple manner. Further notes on the use of "directory-based" cache consistency methods are found, for example, in the article "Torus with slotted rings architecture for a cache-coherent multiprocessor", Proc. 1994 Int. Conf. on Parallel and Distributed Systems, pp 76–81, IEEE Comp. Soc. Press 1994.

Thus, the preferred variant comprising two processors, memories, couplers, coupler interfaces and bus interfaces especially allows systems with from two to eighty processors to be built up by using a single type of central processing unit without needing especially long bus systems or limiting the performance of the processors by means of a single bus system.

The preferred embodiment of the invention hitherto described uses a partitioning in accordance with powers of two, i.e. two, four or eight processors per processor slice. However, it is also possible to use three (or more) processors. This involves two possible variants. The first variant corresponds to the embodiment comprising two couplers and also provides the third coupler with a direct interface and a bus interface. The other variant dispenses with a direct interface and a bus interface for the central coupler. All non-local memory accesses are forwarded to one of the adjacent couplers.

If the number of memory banks is not a power of two, the size thereof will be selected to be relatively large for the interleaving so that a comparatively small number of blocks is produced. The selection is done by a programmable read only memory (PROM), the address lines of which are supplied with the most significant address bits and the data byte of which represents the number of the interleaved memory bank. In the case of three groups and 5 address bits, the content of the PROM consists of the 32 values 0, 1, 2, 0, 1, 2, etc., i.e. the address module three. PROMs having 16 address lines are available in the required speed so that in the case of triple address interleaving, each group is divided into 65536 lines. If two such central processing units are connected to one another, the least significant bit is used for selecting the central processing unit, thus resulting in address interleaving with 6 groups in a simple manner.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A central processing unit comprising,
    at least two groups, each of the groups having one processor, one coupler, one memory and one bus interface, instructions of the processors use a shared address space which contains the memory,
    each coupler of a respective group of the at least two groups connected directly to the processor, the memory and the bus interface of the respective group and to at least one coupler of another group of the at least two groups and connected at least indirectly to each other coupler
    the coupler receiving a memory access of the directly connected processor,
        from the directly connected memory,
        forwarding this memory access to another coupler for accessing the memory associated with another coupler and which is accessible there,
        or executes this access via the bus interface,
    by an address allocation based on an address transferred by the processor.

2. The central processing unit as claimed in claim 1, wherein the unit comprises at least three groups, wherein at least one coupler is connected directly to two other couplers such that the couplers form a row or a ring and a coupler can address a coupler which is not directly connected by a coupler which is connected directly and can cause the coupler which is not directly connected to respond to a memory access in a same manner as a directly connected coupler.

3. The central processing unit as claimed in claim 1, wherein the central processing unit additionally comprises two direct interfaces each of which are connected to one coupler, and wherein the couplers are configurable such that, if the direct interfaces of two identical central processing units are connected in pairs, a virtual central processing unit having at least four groups, couplers connected in a ring and four bus interfaces is produced.

4. The central processing unit as claimed in claim 1, wherein address allocation maps each memory as a contiguous block in a shared address space.

5. The central processing unit as claimed in claim 1, wherein address allocation is carried out by address interleaving in that each memory is distributed over at least two non-adjoining parts of an address space.

6. The central processing unit as claimed in claim 5, wherein the address interleaving is performed by extracting a bit field of an address represented in binary notation.

7. The central processing unit as claimed in claim 6, wherein the allocation is performed by address interleaving the most significant address bits which address a memory containing the allocation.

8. The central processing unit as claimed in claim 1, wherein address allocation for the couplers is effected by address interleaving and wherein a coupler thus addressed determines whether the address belongs to a directly connected memory and, if not, performs a memory access via address resolution predetermined by the bus system.

9. The central processing unit as claimed in claim 8, wherein the address interleaving is performed by extracting a bit field of an address represented in binary notation.

10. The central processing unit as claimed in claim 9, wherein the allocation is performed by address interleaving the most significant address bits which address a memory containing the allocation.

11. The central processing unit as claimed in claim 1, wherein each of two bus systems use separate address and control lines but shared data lines which, if necessary, are used by respective bus via jumpers and access controls.

12. The arrangement of identical central processing units as claimed in claim 1, wherein at least two separate bus systems connect the bus interfaces of the central processing units.

13. The arrangement of identical central processing units as claimed in claim 12, wherein the central processing units are arranged in a row and a bus interface of a central processing unit is connected only to a bus interface of a next central processing unit.

14. The arrangement as claimed in claim 13, wherein the arrangement further comprises a jumper by which two bus systems can be connected to form one single bus system.

15. The arrangement as claimed in claim 14, wherein the jumper connects adjacent ends of the bus systems instead of terminations of the bus system.

16. The arrangement as claimed in claim 12, wherein bus systems are used in such a number that each interface of a central processing unit is connected to one bus system and no bus system connects two bus interfaces of a common central processing unit.

17. The arrangement as claimed in claim 12, wherein the arrangement further comprises a backplane for connecting a number of central processing units.

18. A central processing unit comprising:
one processor, one coupler, one memory, one bus interface and one direct interface;
instructions of the processor using an address space which contains the memory,
the coupler connected to the processor, the memory, the bus interface and the direct interface,
the direct interface being connectable to exactly one direct interface of a second similar central processing unit;
the coupler responding to a memory access of the processor
from the memory,
forwarding this access via the direct interface to a coupler of a similar central processing unit for accessing the memory connected thereto,
or executing this access via the bus interface,
by an address allocation based on a address transferred by the processor.

19. The central processing unit as claimed in claim 18, wherein address allocation maps each memory as a contiguous block in a shared address space.

20. The central processing unit as claimed in claim 18, wherein address allocation is carried out by address interleaving in that each memory is distributed over at least two non-adjoining parts of an address space.

21. The central processing unit as claimed in claim 18, wherein address allocation for the couplers is effected by address interleaving and wherein a coupler thus addressed determines whether the address belongs to a directly connected memory and, if not, performs a memory access via address resolution predetermined by the bus system.

22. The central processing unit as claimed in claim 21, wherein the address interleaving is performed by extracting a bit field of an address represented in binary notation.

23. The central processing unit as claimed in claim 22, wherein the allocation is performed by address interleaving the most significant address bits which address a memory containing the allocation.

24. The central processing unit as claimed in claim 18, wherein each of two bus systems use separate address and control lines but shared data lines which, if necessary, are used by respective bus via jumpers and access controls.

25. The central processing unit as claimed in claim 18, wherein the direct interface is not operable but can be made operable by adding components at places provided therefore.

26. An arrangement of at least two identical central processing units as claimed in claim 18, wherein direct interfaces of different central processing units are connected to one another in pairs.

27. The arrangement as claimed in claim 26, wherein the arrangement further comprises a backplane for connecting a number of central processing units.

28. The arrangement of identical central processing units as claimed in claim 18, wherein at least two separate bus systems connect the bus interfaces of the central processing units.

29. The arrangement of identical central processing units as claimed in claim 28, wherein the central processing units are arranged in a row and a bus interface of a central processing unit is connected only to a bus interface of a next central processing unit.

30. The arrangement as claimed in claim 29, wherein the arrangement further comprises a jumper by which two bus systems can be connected to form one single bus system.

31. The arrangement as claimed in claim 30, wherein the jumper connects adjacent ends of the bus systems instead of terminations of the bus system.

32. The arrangement as claimed in claim 28, wherein bus systems are used in such a number that each interface of a central processing unit is connected to one bus system and no bus system connects two bus interfaces of a common central processing unit.

33. An operating method for a central processing unit A central processing unit comprising:
at least two groups, each of the groups having one processor, one coupler, one memory and one bus interface, instructions of the processors use a shared address space which contains the memory,
each coupler of a respective group of the at least two groups connected directly to the processor, the memory and the bus interface of the respective group and to at least one coupler of another group of the at least two groups and connected at least indirectly to each other coupler
the coupler receiving a memory access of the directly connected processor,
from the directly connected memory,
forwarding this memory access to another coupler for accessing the memory associated with another coupler and which is accessible there,
or executes this access via the bus interface,
by an address allocation based on an address transferred by the processor,
the central processing unit having a cache, consistency of which is achieved by snooping in that each coupler reports memory accesses performed on the directly connected memory on a bus connected to directly thereto and, in turn, forwards an address appearing on the bus in accordance with address allocation, either to the directly connected processor or to another coupler via a direct connection.

34. An operating method for a central processing unit A central processing unit comprising:
at least two groups, each of the groups having one processor, one coupler, one memory and one bus interface, instructions of the processors use a shared address space which contains the memory,
each coupler of a respective group of the at least two groups connected directly to the processor, the memory and the bus interface of the respective group and to at least one coupler of another group of the at least two groups and connected at least indirectly to each other coupler
the coupler receiving a memory access of the directly connected processor,
from the directly connected memory,
forwarding this memory access to another coupler for accessing the memory associated with another coupler and which is accessible there,
or executes this access via the bus interface,
by an address allocation based on an address transferred by the processor,
the central processing unit having a cache, consistency of which is achieved by directories.

* * * * *